March 10, 1959

S. CULP 2,876,651

STEERING MECHANISM

Filed Nov. 22, 1954

INVENTOR.
BY STANFORD CULP

Attorney

INVENTOR.
STANFORD CULP

United States Patent Office 2,876,651
Patented Mar. 10, 1959

2,876,651

STEERING MECHANISM

Stanford Culp, Detroit, Mich.

Application November 22, 1954, Serial No. 470,181

2 Claims. (Cl. 74—388)

My invention relates to a new and useful improvement in a steering mechanism for steering vehicles.

It is an object of the present invention to provide a steering mechanism which is mechanically operated and which is also provided with a power driven mechanism which becomes effective when the torque resistance of the steering post reaches a predetermined amount.

It is an object of the present invention to provide a steering mechanism of this type which will be simple in construction, economical in manufacture, durable, and highly efficient in use.

Another object of the invention is the provision of a steering mechanism of this class wherein the mechanical steering mechanism remains effective even after the power mechanism has become effective.

Another object of the invention is the provision of a steering mechanism by the use of which the steering of a vehicle may be easily and quickly effected.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which.

Figure 1:
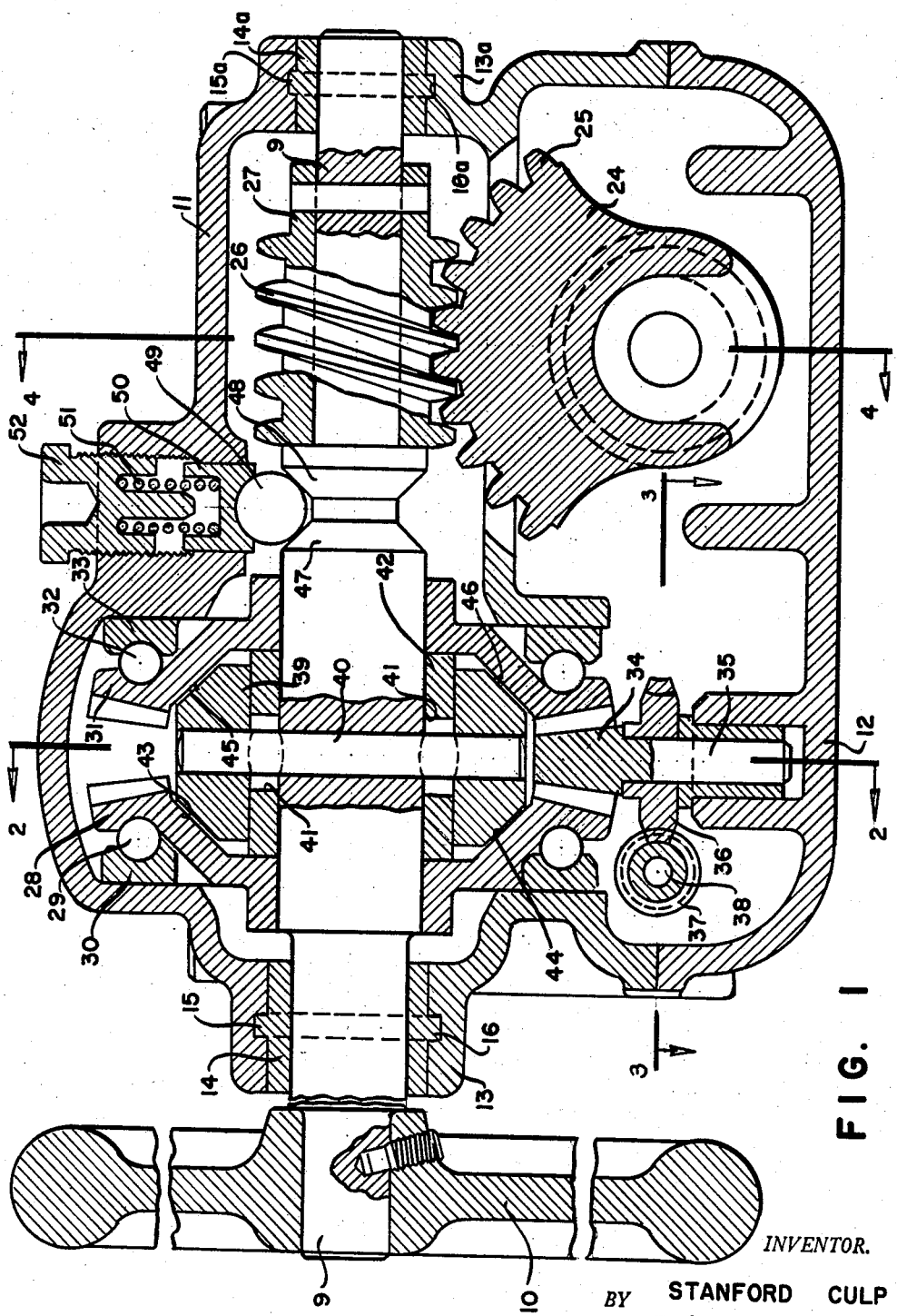
Fig. 1 is a longitudinal central sectional view of the invention with a part of the steering post broken away.
Figure 2:
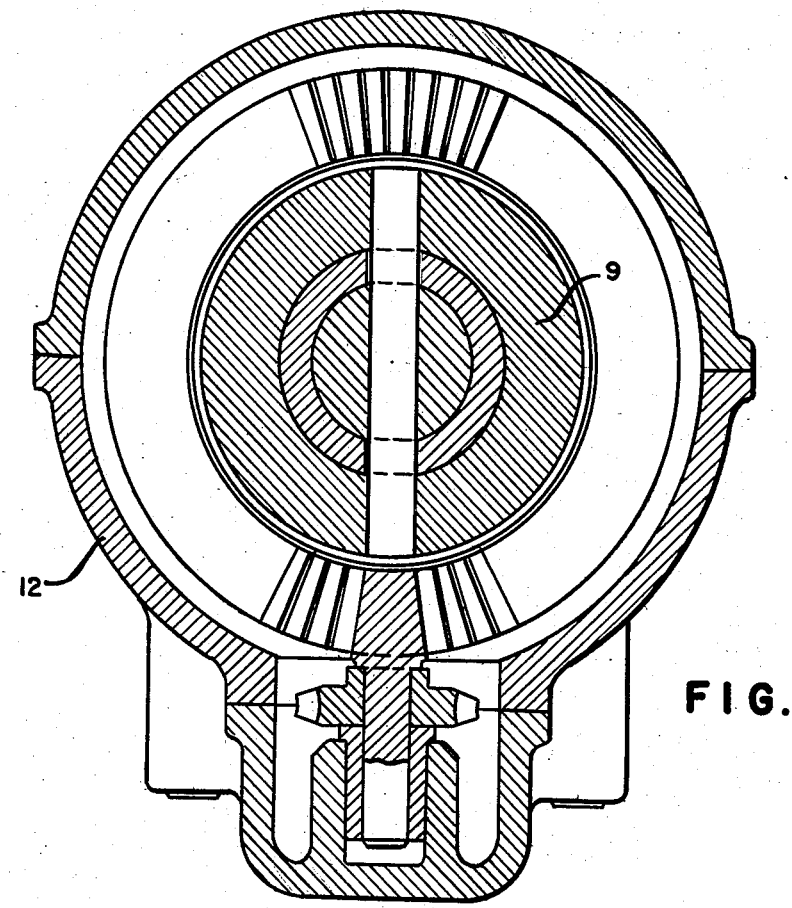
Fig. 2 is a sectional view taken on line 2—2 of Fig. 1.

In the drawings, I have illustrated a steering post 9 mounted on which is a steering wheel 10 whereby the post may be rotated. The steering post extends through a housing comprising a pair of sections 11 and 12. The steering post is journalled in the housing on the bearings 14 and 14a, held in position in the hubs 13 and 13a by the outwardly projecting flanges 15 and 15a engaging in the grooves 16 and 16a.

Figure 4:
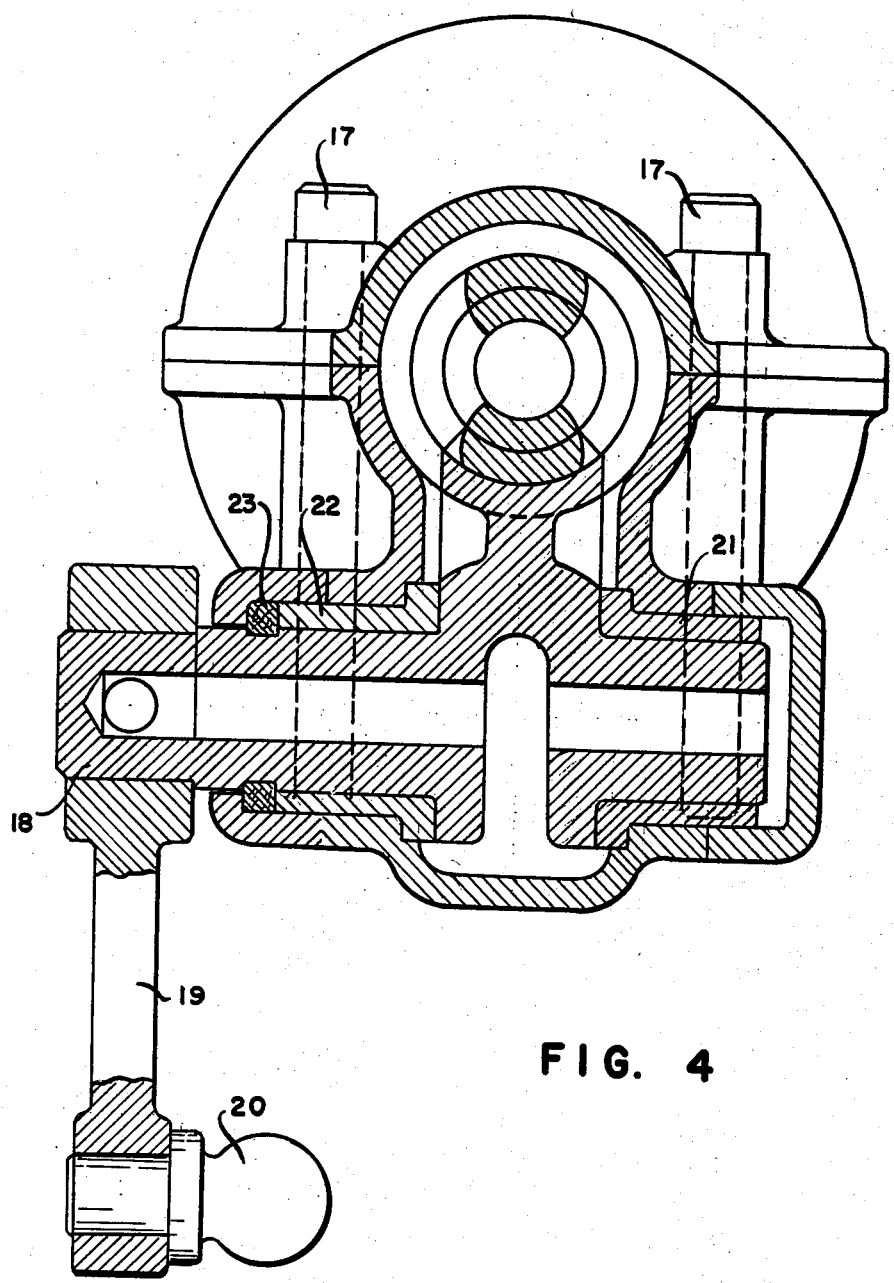
Fig. 4 is a sectional view taken on line 4—4 of Fig. 1.

Extending outwardly from one side of the housing is a shaft 18 on which is fixedly mounted an arm 19 carrying the ball 20 which is intended to be fastened to the tie-rod of the vehicle. The shaft 18 is journalled in the bushings 21 and 22 and against one side of the bushing 22 is a seal 23, as shown in Fig. 4. On the shaft 18 is a segment 24 having teeth 25 meshing with teeth 26 of the worm 27 which is fixedly mounted on the steering post so that upon the rotating of the steering post, the arm 19 may be rocked in one direction.

The construction so far described is largely conventional in vehicle steering mechanisms now in use.

Figure 3:
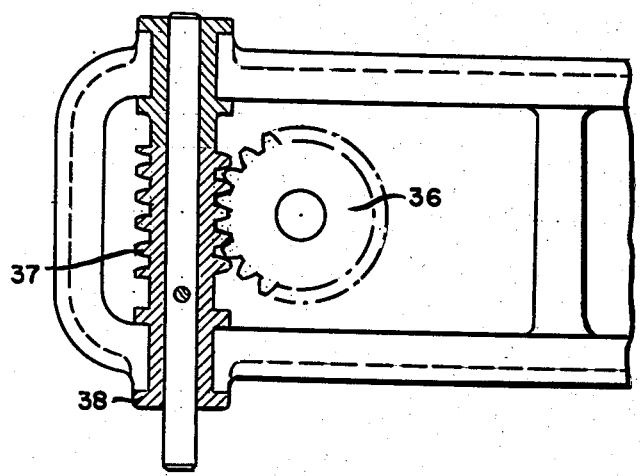
Fig. 3 is a fragmentary sectional view taken on line 3—3 of Fig. 1.

Mounted in the housing is a ring gear 28 bearing against the balls 29 which engage the race 30. Spaced from and facing the ring gear 28 is a ring gear 31 bearing against the balls 32 which ride in the race 33. A bevel gear 34 meshes with the ring gears 28 and 31 and is fixed to rotate with the shaft 35 on which is fixedly mounted the worm gear 36 meshing with a worm 37 which is fixed to the shaft 38, as shown in Fig. 3.

This shaft 38 may be driven by a separate electric motor, a power take-off, or in any other suitable manner, but while the vehicle is running, the shaft 38 is always rotated so that the gears 28 and 31 are rotating on the steering post 9. Fixedly mounted on the steering post 9, and within the housing, is a spacing sleeve 42 which engages each of the gears 28 and 31 and serves to retain the same in a fixed position in the housing. Embracing this spacing sleeve 42 is a ring 39 secured to the shaft 40 which extends through the slots 41 formed in the sleeve 42. This ring 39 is formed of any desirable friction material, such as brake-lining, or the like. The ring 39 of friction material is provided with the inclined face 43 normally spaced from the inclined face 44 of the gear 28. On the opposite side of the ring 39 is the inclined face 45 normally spaced from the inclined face 46 of the gear 31.

The steering post, within certain limits, may move longitudinally of the housing. Formed in the steering post is a groove having the inclined faces 47 and 48 engaged against which is a ball 49 normally pressed into the groove by the presser-head 50 against which one end of a spring 51 engages. This spring 51 fits within the fitting 52 which may be threaded inwardly and outwardly of the housing so as to adjust the tension of the spring.

In operation, when the operator desires to turn the steering post, such action is obtained in the usual manner by rotating the steering wheel. When resistance to turning is met, a longitudinal thrust will be delivered to the steering post which would cause the steering post to move longitudinally in one direction or the other, forcing the ball 49 upwardly of the groove riding on one of the faces 47 or 48. The steering post in this longitudinal movement would bring the ring of friction material to approach either the gear 28 or 31 so that the surfaces 43 or 45 will engage the surfaces 44 or 46 of these gears 28 and 31. Since the ring 39 is fixed to the steering post by a pin 40 this will effect the rotation of the steering post in one direction or the other. This rotation through the power driven gears 28 and 31 will continue so long as the longitudinal thrust is delivered to the steering post. Immediately upon letting up of the longitudinal thrust, the ball 49 will again seat itself to retain the faces 45 and 43 of the friction ring 39 in spaced relation to the contacting faces of the gears 28 and 31.

In this manner, I have provided a steering mechanism which is mechanically operated but which is also provided with a power driven element which becomes effective when the steering becomes difficult.

What I claim is:

1. A vehicle steering mechanism comprising a rotatable steering post; a gear fixedly mounted on and rotatable with said post; a toothed segment cooperating with said gear and rockable upon rotation of said steering post and adapted upon encountering resistance to rocking movement, for delivering a longitudinal thrust to said post; a pair of spaced apart ring gears rotatably mounted on said post; a clutch member fixedly mounted on said post and positioned between said ring gears and normally out of contact with said ring gears and movable, upon a longitudinal thrust being delivered to said post, into engagement with one or the other of said ring gears for maintaining the same in fixed rotated relation to said post; power driven means for rotating said ring gears in opposite directions; yieldable means for normally resisting the longitudinal movement of said post in response to a longitudinal thrust delivered thereto, and operable, upon release of said longitudinal thrust for moving said post to normal position.

2. In a vehicle steering mechanism, a rotatable steering post; a pair of spaced apart ring gears rotatably mounted on said post; a clutch forming member fixedly mounted on said post and positioned between said ring gears and having a bearing face at opposite sides for engaging a bearing surface on said ring gears, said bearing surfaces being normally spaced apart and said clutch member being engageable with the bearing surface of one or the other of said ring gears upon longitudinal movement of said steering post; power driven means for normally rotating said ring gears; a worm on said steering post; a rockable segment engaging said worm and rockable upon rotation on said post and adapted, upon encountering resistance to rocking movement, for delivering a longitudinal thrust to said post in one direction or the other depending upon the direction of rotative torque delivered to said post.

References Cited in the file of this patent

UNITED STATES PATENTS

| | | |
|---|---|---|
| 298,169 | Broomell | May 6, 1884 |
| 1,763,470 | Lemon | June 10, 1930 |
| 2,062,774 | Woolley | Dec. 1, 1936 |
| 2,587,495 | MacDuff | Feb. 26, 1952 |
| 2,667,232 | Woolley | Jan. 26, 1954 |